US012760810B2

(12) United States Patent
Icard et al.

(10) Patent No.: US 12,760,810 B2
(45) Date of Patent: Oct. 13, 2026

(54) FLUIDIC DEVICE COMBINING A NON-RETURN VALVE AND A DUAL-FLOW FLOW RESTRICTOR

(71) Applicant: Faurecia Hydrogen Solutions France, Nanterre (FR)

(72) Inventors: Sullivan Icard, Thionville (FR); Edouard Naulin, Dorans (FR)

(73) Assignee: Faurecia Hydrogen Solutions France, Nanterre (FR)

( * ) Notice: Subject to any disclaimer, the term of this patent is extended or adjusted under 35 U.S.C. 154(b) by 0 days.

(21) Appl. No.: 18/814,704

(22) Filed: Aug. 26, 2024

(65) Prior Publication Data

US 2025/0075816 A1 Mar. 6, 2025

(30) Foreign Application Priority Data

Sep. 1, 2023 (FR) ...................................... 2309205

(51) Int. Cl.
*F16K 17/30* (2006.01)

(52) U.S. Cl.
CPC ........ *F16K 17/30* (2013.01); *F16K 2200/202* (2021.08); *F16K 2200/402* (2021.08)

(58) Field of Classification Search
CPC .... F16K 17/30; F16K 17/24; F16K 2200/202; F16K 2200/402; F16K 15/025; G05D 7/0133; Y10T 137/7846; Y10T 137/7847; Y10T 137/7848
See application file for complete search history.

(56) References Cited

U.S. PATENT DOCUMENTS

| | | | | | |
|---|---|---|---|---|---|
| 2,335,814 | A * | 11/1943 | Stevenson | F16K 15/025 137/111 |
| 4,630,640 | A | 12/1986 | DiBartolo | |
| 5,634,489 | A * | 6/1997 | Tschauner | F16K 17/24 251/16 |
| 6,196,259 | B1 * | 3/2001 | Weber | G05D 7/0133 137/504 |
| 6,374,852 | B1 * | 4/2002 | Olivas | F16K 17/30 137/493.9 |

(Continued)

FOREIGN PATENT DOCUMENTS

| | | | |
|---|---|---|---|
| FR | 2982925 | A1 | 5/2013 |
| FR | 3037377 | A1 | 12/2016 |

OTHER PUBLICATIONS

Machine Translation of FR3037377A1 retrieved from espacenet.com (Year: 2025).*

(Continued)

*Primary Examiner* — Jessica Cahill
(74) *Attorney, Agent, or Firm* — Carlson, Gaskey & Olds, P.C.

(57) ABSTRACT

A fluidic device comprises an inlet and an outlet connected by a body forming a channel between the inlet and the outlet. The fluidic device further comprises a non-return valve shaped to prevent a fluid from passing from the outlet to the inlet, and a flow restrictor shaped to allow a fluid to pass from the inlet to the outlet at a first flow rate when the differential pressure between the outlet and the inlet is below a threshold(S). Fluid passes from the inlet to the outlet at a second flow rate, significantly lower than the first flow rate, when the differential pressure between the outlet and the inlet is above the threshold.

20 Claims, 7 Drawing Sheets

(56) References Cited

U.S. PATENT DOCUMENTS

| | | | | |
|---|---|---|---|---|
| 6,408,870 | B1 | 6/2002 | Dulin | |
| 7,552,743 | B1 | 6/2009 | Achterman | |
| 2003/0041902 | A1 * | 3/2003 | Dulin | G05D 7/0133 137/462 |
| 2003/0121548 | A1 * | 7/2003 | Giordano | F16K 17/30 137/505 |
| 2004/0177888 | A1 * | 9/2004 | Heeks | E01F 9/529 137/599.18 |
| 2009/0320931 | A1 * | 12/2009 | Wears | F16K 47/08 137/15.18 |
| 2015/0122340 | A1 * | 5/2015 | Edelmayer | F02N 19/00 137/154 |

OTHER PUBLICATIONS

Preliminary Research Report Dated Feb. 28, 2024 for French Application No. 2309205.

* cited by examiner

[Fig 1]
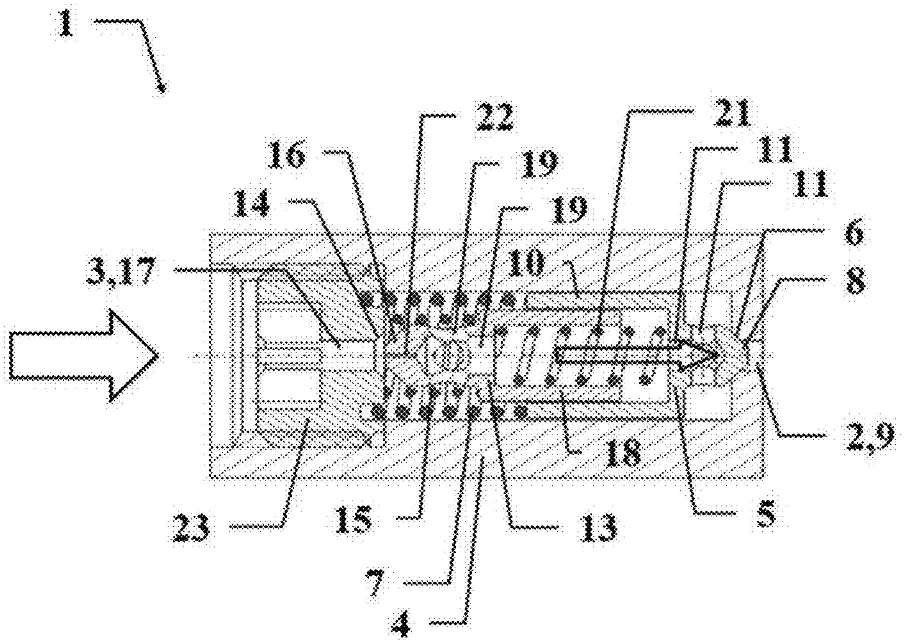

[Fig 2]
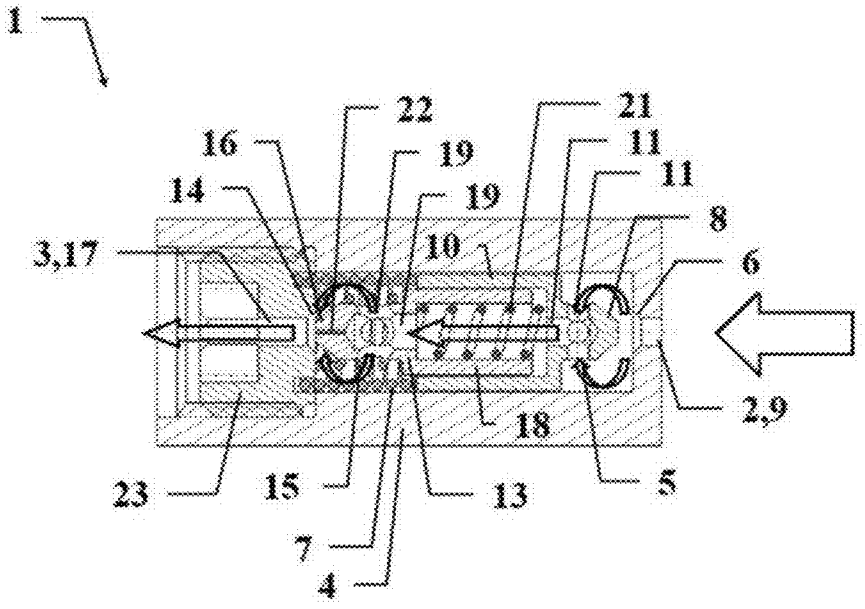

[Fig 3]
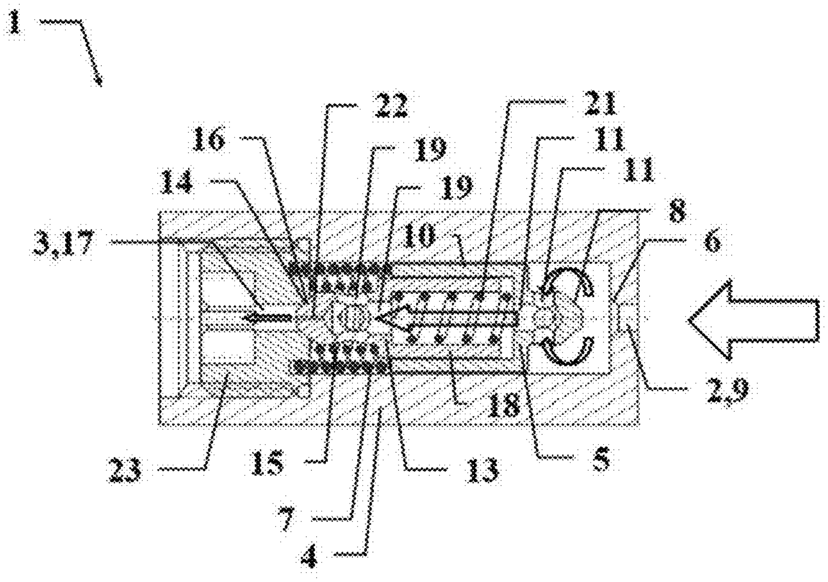

[Fig 4]
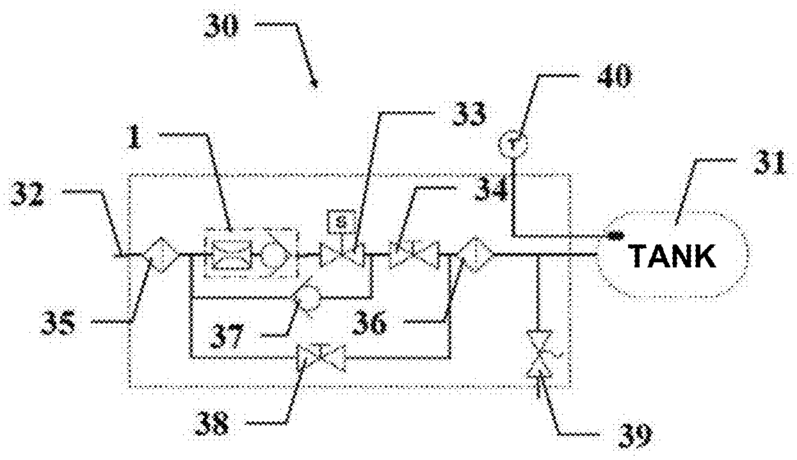

[Fig 5]
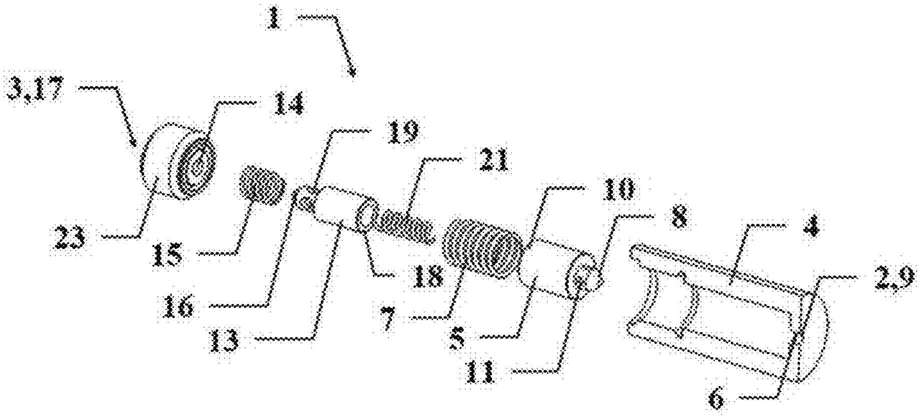

[Fig 6]
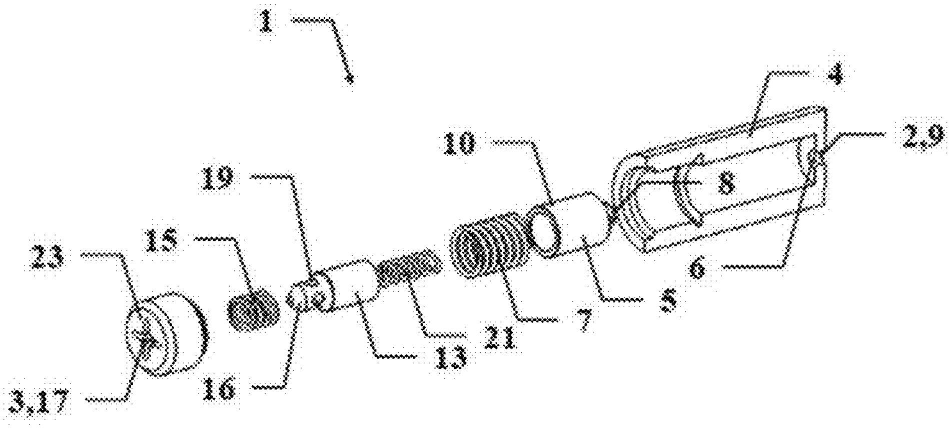

[Fig 7]
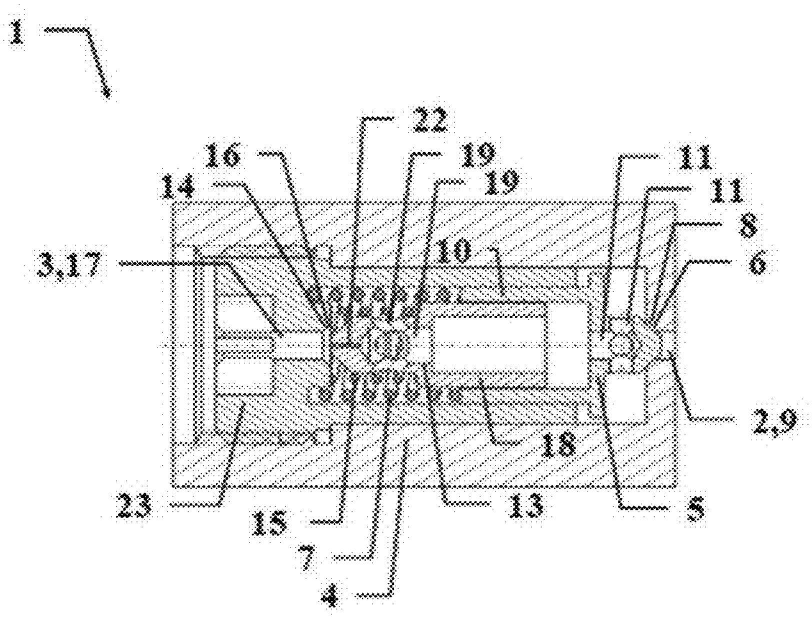

FLUIDIC DEVICE COMBINING A NON-RETURN VALVE AND A DUAL-FLOW FLOW RESTRICTOR

CROSS-REFERENCE TO RELATED APPLICATION

This application is a U.S. non-provisional application claiming the benefit of French Application No. 2309205, filed on Sep. 1, 2023, which is incorporated herein by reference in its entirety.

TECHNICAL FIELD

The disclosure relates to a fluidic device, comprising an inlet and an outlet and combining the functions of a non-return valve in one direction and a flow restrictor in the other direction.

BACKGROUND

An on-tank valve (OTV) assembly is designed to be mounted at the top of a fluid tank to enable it to be connected to a line. The tank valve assembly provides filling, tapping, and safety functions. Advantageously, the use/tapping line comprises a non-return valve to prevent fluid from flowing back into the tank. Advantageously, the use/tapping line further comprises a flow restrictor that allows a nominal use flow rate to pass out of the tank when a nominal backpressure is present, and drastically limits the outflow when no significant backpressure is present, suggesting a critical line rupture situation.

The disclosure offers an advantageous concept for combining these three functions in a particularly small volume, suitable for a tank valve assembly.

SUMMARY

For this purpose, the disclosure has as its object a fluidic device, comprising an inlet and an outlet connected by a body forming a channel between the inlet and the outlet, wherein the device comprises a non-return valve shaped to prevent a fluid from passing from the outlet to the inlet, and a flow restrictor shaped to allow a fluid to pass from the inlet to the outlet at a first flow rate when the differential pressure between the outlet and the inlet is below a threshold, and at a second flow rate, significantly lower than the first flow rate, when the differential pressure between the outlet and the inlet is above the threshold.

Particular features or embodiments, usable alone or in combination, are:

- the non-return valve comprises a non-return piston and a non-return seat, wherein the non-return piston is adapted to be pushed towards the non-return seat by a fluid flowing from the outlet to the inlet, wherein the non-return seat has a non-return hole coinciding with the inlet and the non-return piston comprises a non-return end, arranged opposite the non-return hole, shaped in a complementary manner to the non-return hole so that the non-return end closes the non-return hole when pushed against it,
- the flow restrictor comprises a restrictor piston and a restrictor seat, the restrictor piston is adapted to be pushed towards the restrictor seat by a fluid flowing from the inlet to the outlet, the restrictor seat has a restrictor hole coinciding with the outlet and the restrictor piston comprises a restrictor end, arranged opposite the restrictor hole, shaped in a complementary manner to the restrictor hole so that the restrictor end closes the restrictor hole when pushed against it,
- the restrictor end is pierced by a leak facing the restrictor hole, preferably calibrated,
- the non-return piston and the restrictor piston are arranged telescopically,
- the non-return valve further comprises a non-return biasing member, the non-return biasing member tends to push the non-return piston in the direction of the non-return seat, and the flow restrictor further comprises a restrictor biasing member, the restrictor biasing member tends to move the restrictor piston away from the restrictor seat,
- the device further comprises a balancing biasing member tending to move the non-return piston away from the restrictor piston,
- the non-return piston further comprises at least one non-return through-hole,
- the restrictor piston also comprises at least one restrictor through-hole,
- the non-return seat, coinciding with the inlet, is made of the same material as the body or with a drilled plug mounted on the body, preferably by way of a thread, and the restrictor seat, coinciding with the outlet, is made of the same material as the body or with a drilled plug mounted on the body, preferably by way of a thread.

BRIEF DESCRIPTION OF THE DRAWINGS

The disclosure will be better understood on reading the following description, given solely by way of example, and with reference to the appended figures in which:

FIG. 1 shows a cutaway profile view of a device in the presence of a pressure drop in the opposite direction;

FIG. 2 shows a cutaway profile view of the device shown in FIG. 1, with a nominal pressure drop in the nominal direction;

FIG. 3 shows a cutaway profile view of the device shown in FIG. 1, in the presence of a significant pressure drop, potentially indicative of a line rupture;

FIG. 4 shows a fluidic diagram of a valve assembly housing a device;

FIG. 5 and FIG. 6 show an exploded perspective view of the device shown in FIG. 1, from two points of view respectively; and FIG. 7 shows, in a cutaway profile view, a device according to one embodiment without a balancing biasing member.

DETAILED DESCRIPTION

FIG. 2 shows a device 1 according to the disclosure in its resting configuration. This configuration is also substantially identical to the nominal configuration, when a slight negative pressure variation is present between the inlet 2 on the right and the outlet 3 on the left of the device 1. The device 1 in such a case allows passage from the inlet 2 to outlet 3 and acts as a flow restrictor.

The diagram in FIG. 4 shows the fluid flow diagram of an on-tank valve (OTV) assembly 30. Such a valve assembly 30 is designed to be mounted at the top of a fluid tank 31, such as a hydrogen tank, to enable it to be connected to a line 32. The tank valve assembly 30 provides filling, tapping, and safety functions. The line 32 is used either to fill the tank 31 or, when in use, to draw off the fluid contained in the tank 31.

The valve assembly 30 connects the tank 31 to the line 32 via a main conduit. This main conduit houses a device 1. It further comprises a strainer 35, 36 at each end. It further comprises a solenoid valve 33 and a shut-off valve 34, in series with the device 1.

This main conduit is used for tapping. When the valves 33, 34 are open, the fluid contained in the tank 31 can flow from right to left, towards the line 32.

The valve assembly 30 further comprises a first secondary conduit, housing a non-return valve 37 and branching off from the main conduit. This first secondary conduit is designed to fill the tank 31. When the valve 34 is open and the solenoid 33 is closed, fluid can flow from the line 32, from left to right, to the tank 31. The non-return valve 37 ensures that the fluid does not pass through the first secondary conduit during tapping.

The valve assembly 30 further comprises a second secondary conduit, housing a manual valve 38 and branching off from the main conduit. This second secondary conduit creates a bypass.

The valve assembly 30 further comprises a vent line comprising a safety valve 39 or TPRD (thermal pressure relief device), enabling fluid to be evacuated in the event of excess pressure.

The valve assembly 30 further comprises a temperature sensor 40 measuring the temperature of the tank 31.

At the point on the valve assembly 30 where it is located, a fluidic device 1 according to the disclosure advantageously performs three functions corresponding to three operating modes: a nominal usage/tapping mode, a critical mode or mode for usage in the event of a break in line 32, and a filling mode.

During the filling of the tank 31, the fluid pressure is higher at the outlet 3 of the device 1 than at the inlet 2. The solenoid valve 33 is closed. The valve 34 is open. The valve 38 is closed. The fluid flows, in the plane of the diagram, from left to right. This flow passes through the first secondary conduit, with non-return valve 37 being passable. In this filling mode, the device 1 must act as a non-return valve to prevent excessive pressure stress on the solenoid valve 33.

During nominal operation, the fluid from the tank is used by a consumer connected to the line 32. The solenoid valve 33 is open. The valve 34 is open. The valve 38 is closed. Fluid flows from right to left. This flow passes through the primary line and crosses the device 1 from right to left, i.e. from the inlet 2 to the outlet 3. In this nominal tapping mode, the device 1 must act as a flow restrictor, with a calibrated orifice.

A break may occur in the line 32. When it does, the line switches to a critical mode. In this critical mode, it is desired to drastically limit fluid outflow from the tank 31. The solenoid valve 33 is still open. The valve 34 is still open. The valve 38 is still closed. Fluid still flows from right to left. This flow still passes through the primary line and crosses the device 1 from right to left, i.e. from the inlet 2 to the outlet 3. In this critical mode, the device 1 must perform a drastic flow-restricting function, since the fluid drawn is supposedly lost.

To this end, the fluidic device 1 is a dipole in that it comprises an inlet 2 and an outlet 3 connected by a body 4. This body 4 forms a channel between the inlet 2 and the outlet 3.

The device 1 comprises a non-return valve 5-11. This non-return valve 5-11 is shaped to prevent the passage of a fluid from the outlet 3 to the inlet 2, i.e. in a direction opposite to the nominal direction of usage/drawing.

The device 1 further comprises a flow restrictor 13-19. This flow restrictor 13-19 is shaped to allow the fluid to flow in the direction of use, i.e. from the inlet 2 to the outlet 3. Two modes are present: a nominal mode and a critical mode.

In nominal mode, the fluid circulates at a first or nominal flow rate. Nominal mode is characterized by the detection of a pressure difference ΔP, between the outlet 3 and the inlet 2, remaining low, i.e. below a threshold S. During nominal drawing, the fluid consumer ensures sufficient backpressure so that the pressure drop ΔP does not exceed the threshold S.

In the critical mode, fluid circulation takes place at a second, or critical, flow rate that is significantly lower than the first flow rate. The critical mode is characterized by the detection of a larger pressure difference ΔP, between the outlet 3 and the inlet 2, i.e. greater than the threshold S. A break in the line 32 would result in a very low pressure, approximately equal to atmospheric pressure, at the outlet 3. The presence of significant pressure at the inlet 2, due to the presence of the tank 31, would then result in a significant pressure drop ΔP. Also, conversely, the detection of a significant pressure drop ΔP, greater than the threshold S, is interpreted as a break in the line 32. The threshold S discriminates between nominal and critical modes.

To achieve these functions, the disclosure proposes a device 1. An example of this device 1 is illustrated in FIGS. 1-3, 5, 6. FIG. 1 shows the device 1 in filling mode. FIG. 2 shows the device 1 in nominal mode. FIG. 3 shows the device 1 in critical mode.

To perform the three functions, the device 1 comprises two components: A non-return valve 5-11 and a flow restrictor 13-19. These two components comprise many similar parts. To distinguish them, the non-return valve parts 5-11 have the word "non-return" before their name, and the restrictor parts 13-19 have the word "restrictor" before their name.

To perform the non-return valve function, the non-return valve 5-11 comprises a non-return piston 5 and a non-return seat 6. The non-return piston 5 can slide inside the body 4. In particular, the non-return piston 5 is shaped to be pushed in the direction of the non-return seat 6, i.e. from left to right in the plane of the figures, by a fluid flowing from the outlet 3, located on the left, to the inlet 2, located on the right. The non-return seat 6 has a non-return hole 9 which is fluidly merged with the inlet 2 and constitutes the only fluid passageway. The non-return piston 5 is shaped at one of its ends, referred to as the non-return end 8, to complement the non-return hole 9. Said non-return end 8 faces the non-return hole 9. Thus, when the non-return piston 5 and its non-return end 8 are pushed against the non-return seat 6, the non-return end 8 closes the non-return hole 9, preventing any fluid passage.

The complementary shape of the non-return end 8 and the non-return seat 6 on the edges of the non-return hole 9 is designed to provide a seal. These shapes are, for example, cone/cone or sphere/cone.

The non-return function desired in the application envisaged for device 1 does not require a tight seal. A simple contact between the non-return end 8 and the non-return hole 9 is also sufficient. If a tighter seal is required, a seal can be added to the contact ring between the non-return end 8 and the non-return hole 9.

To perform both flow control functions, the flow restrictor 13-19 comprises a restrictor piston 13 and a restrictor seat 14. The restrictor piston 13 can slide inside the body 4. In particular, the restrictor piston 13 is shaped to be pushed in the direction of the restrictor seat 14, i.e. from right to left in the plane of the figures, by a fluid flowing from the inlet 2, located on the right, to the outlet 3, located on the left. The restrictor seat 14 has a restrictor hole 17 which fluidly coincides with the outlet 3 and constitutes the only fluid passageway. The restrictor piston 13 is shaped at one of its ends, known as the restrictor end 16, to complement the restrictor hole 17. Said restrictor end 16 faces the restrictor hole 17. Thus, when the restrictor piston 13 and its restrictor end 16 are pushed against the restrictor seat 14, the restrictor end 16 closes the restrictor hole 17, preventing substantially all fluid passage.

According to another feature, the restrictor end 16 is pierced by a leak 22. This leak 22, or leakage channel, is opposite the restrictor hole 17 and thus connects the outlet 3 to the right-hand part of the restrictor piston 13 and therefore with the inside of the device 1. This leak 22 determines the leak flow rate, i.e. the reduced flow rate, which is the only one authorized in critical mode. This is illustrated in FIG. 3. The very low pressure at the outlet 3 in critical mode, relative to the pressure from the tank 31, results in a sharp drop in pressure in the device 1. This causes the fluid to push the restrictor piston 13 from the inlet 2 to the outlet 3, from right to left. This then closes the restrictor seat 14. The only remaining outlet for the fluid is the leak 22 which passes through the restrictor piston 13, through its restrictor end 16, in line with the restrictor hole 17. This leak 22 is preferably calibrated.

According to another feature, the non-return piston 5 and the restrictor piston 13 are arranged telescopically. This feature is highly advantageous in that it makes it possible to design a particularly compact device 1, mainly in terms of length along its axis, and thus to facilitate the integration of the device 1 into a valve assembly 30. For this purpose, each of the two pistons, the non-return piston 5 and the restrictor piston 13, is bell-shaped on the side of their other end 10, 18, respectively opposite the end 8, 16 which faces the seat 6, 14. Telescopic mounting is then made possible by the bell of one piston 5, 13 enveloping the bell of the other piston 5, 13. Thus, as illustrated in the figures, the non-return piston 5 surrounds the restrictor piston 13 substantially concentrically. The reverse, i.e. the restrictor piston 13 surrounding the non-return piston 5, would also be possible and equivalent.

In order to create a sensor capable of detecting the different pressure drop values that determine the operating mode (nominal mode, critical mode and filling mode), it is advisable to judiciously arrange biasing members 7, 15, 21, e.g., springs, whose respective arrangements and stiffnesses will enable the three configurations shown in FIGS. 1-3, corresponding to the operating modes, to be achieved. The person skilled in the art knows how to size these biasing members according to the modes and thresholds S of the pressure drop value. The threshold S determines the mode change between nominal and critical modes. Another, implicit, threshold corresponds to the change in direction of the pressure drop, and determines the mode change between nominal mode and filling mode.

According to a further feature, the non-return valve 5-11 also comprises a non-return biasing member 7, e.g., a spring. The non-return biasing member 7 is arranged so that it tends to push the non-return piston 5 towards the non-return seat 6. This means that the non-return valve 5-11 is closed by default. An operating pressure, from inlet 2 to outlet 3, pushes the non-return piston 5 and acts against the non-return biasing member 7 to open the non-return valve 5-11. The non-return biasing member 7 acts between the non-return piston 5 and the body 4. In a preferred embodiment, the non-return biasing member 7 is a compression coil spring, arranged between the other non-return end 10 of the non-return piston 5 and the body 4, to the left of the non-return piston 5, i.e. on the outlet 3 side. In the embodiment illustrated in the figures, the support is on the plug 23, which is here considered akin to the body 4.

According to another feature, the flow restrictor 13-19 further comprises a restrictor biasing member 15, e.g., a spring. The restrictor biasing member 15 is arranged so that it tends to move the restrictor piston 13 away from the restrictor seat 14. In this way, the flow restrictor 13-19 is open by default, allowing a large initial flow rate to pass through. A small pressure drop, below the threshold S, is not sufficient to press the restrictor piston 13 against the restrictor seat 14. The restrictor biasing member 15 acts between the restrictor piston 13 and the body 4. In a preferred embodiment, the restrictor biasing member 15 is a compression coil spring, arranged between the other restrictor end 18 of the restrictor piston 13 and the body 4, to the left of the restrictor piston 13, i.e. on the outlet 3 side. In the embodiment illustrated in the figures, the support is on the plug 23, which is here considered akin to the body 4.

A device 1 according to the disclosure can operate without a balancing member 21 described above. Such a device 1 is illustrated in FIG. 7.

Such a device 1 is, however, more constraining to design. Such a design choice leads to tighter tolerance constraints on the sizing of the non-return biasing member 7 and the restrictor biasing member 15, as well as on the lengths of the respective telescopic parts of the non-return piston 5 and the restrictor piston 13.

Thus, according to another feature, the device 1 advantageously comprises a balancing biasing member 21. The balancing biasing member 21 is arranged so that it tends to move the non-return piston 5 away from the restrictor seat 13. The balancing biasing member 21 acts between the non-return piston 5 and the restrictor piston 13. In a preferred embodiment, the balancing biasing member 21 is a compression coil spring arranged between the non-return piston 5 and the restrictor piston 13.

According to a further feature, the non-return piston 5 also comprises at least one non-return through-hole 11. This at least one non-return hole 11 is a through-hole in that it brings the two sides of the non-return piston 5 into fluid connection. Also, the total cross-section of said at least one non-return hole 11 is such as to allow a through-flow through the non-return piston 5 corresponding to the needs of the device 1 and allowing in particular for restricted flow in nominal mode. However, this cross-section must remain small if the non-return piston 5 is to perform its piston function and move under the effect of a fluid flow coming from the left of the non-return piston 5. This at least one non-return hole 11 can be axial, provided it is located on the periphery of the non-return piston 5. Alternatively or complementarily, if the hole 11 is more central, it is, as shown in FIGS. 1-3, partially axial on the side of the other non-return end 10 and ends radially so as not to modify the non-return piston 5 at the non-return end 8. The non-return end 8 must remain sealed, at least where it faces the non-return hole 9 in the non-return seat 6.

According to a further, analogous feature, the restrictor piston 13 also comprises at least one restrictor through-hole 19. This at least one hole 19 is a through-hole in that it brings the two sides of the restrictor piston 13 into fluid connection. In addition, the total cross-section of said at least one restrictor hole 19 is such as to allow a through-flow through the restrictor piston 13 corresponding to the needs of the device 1, and in particular allowing limited flow in nominal mode and reverse flow in critical mode until the non-return valve 5-11 is closed. However, this cross-section must remain small if the restrictor piston 13 is to perform its piston function and move under the effect of a fluid flow coming from the right of the restrictor piston 13. This at least one hole 19 can be axial, provided it is located on the periphery of the restrictor piston 13. Alternatively or complementarily, if the restrictor hole 19 is more central, it is, as shown in FIGS. 1-3, partially axial on the side of the other restrictor end 18 and ends radially so as not to modify the restrictor piston 13 at the restrictor end 16. The restrictor end 16 must remain substantially sealed, at least where it faces the restrictor hole 17 in the restrictor seat 14. The term "substantially" in the previous sentence refers to the sealing exception formed by the leak 22.

In nominal mode, as illustrated in FIG. 2, the restrictor piston 13 is not in contact with the restrictor seat 14. The nominal flow rate in nominal mode is then the flow rate determined by said at least one non-return hole 11 and said at least one restrictor hole 19. More precisely, the nominal flow rate is the flow rate determined by the smaller cross-section of the two holes 11, 19.

In critical mode, as illustrated in FIG. 3, the restrictor piston is in contact with the restrictor seat 14, so the restrictor 13-19 is locked. The critical flow rate is the flow rate determined by the leak 22.

The non-return piston 5 is biased to its closed position mainly by the non-return biasing member 7. The non-return piston 5 reaches a stable position of full opening from a pressure threshold value S which is a function of pressure and flow. This position is reached either when the turns of the non-biasing member 7 are joined, or when the non-return piston 5 is in abutment against its seat.

For nominal conditions: tapping mode and filling mode, the fluid passage holes are dimensioned so that the fluidic device 1 has a defined pressure loss coefficient.

In the critical mode, the differential pressure is well above the threshold value S. When the non-return piston 5 reaches its stable position, the force of the balancing biasing member 21 on the restrictor piston 13 is no longer dependent on the position of the non-return piston 5. From a second pressure threshold S2 onwards, due to the increase in flow, the restrictor piston 13 moves in the direction of the seat. The second threshold S2 is much larger than the first threshold S.

The leak 22 is calibrated according to several system operating parameters.

The balancing biasing member 21 must apply a permanent force to press the restrictor piston 13 against the restrictor biasing member 15. The stiffness of the balancing biasing member 21 is very low compared with the stiffness of the non-return biasing member 7, so as not to cause the restrictor piston 13 to move when the non-return piston 5 moves.

According to another feature, the non-return seat 6 is made integral with the body 4. Alternatively, the non-return seat 6 is made of the same material as a plug 23. The body 4 or the plug 23 is then drilled to create the non-return hole 9. The plug 23 is assembled with the body 4. This can be achieved, preferably, by way of a thread.

According to another feature, the restrictor seat 14 is made integral with the body 4. Alternatively, as illustrated in FIGS. 1-3, the restrictor seat 14 is made of a material with a plug 23. The body 4 or the plug 23 is then drilled to create the restrictor hole 17. The plug 23 is assembled with the body 4. This can be achieved, preferably, by way of a thread.

The plug 23 also provides access to the hollow interior of body 4, where all the components 5-22 of device 1 can be inserted during assembly.

The device 1 is shown with a plug 23 on the left, outlet side. It is also possible to create a device 1 with a plug on the right, inlet side. The device 1 may also comprise two plugs, one on each side.

The stacking of components for the assembly of a device 1 is more particularly illustrated in exploded FIGS. 5 and 6.

The disclosure has been illustrated and described in detail in the drawings and the preceding description. This must be considered as illustrative and given by way of example and not as limiting the disclosure to this description alone. Many alternative embodiments are possible.

LIST OF REFERENCE SIGNS

- 1: device,
- 2: input,
- 3: output,
- 4: body,
- 5: non-return piston,
- 6: non-return seat,
- 7: non-return biasing member,
- 8: non-return end,
- 9: non-return hole,
- 10: other non-return end,
- 11: non-return hole,
- 13: restrictor piston,
- 14: restrictor seat,
- 15: restrictor biasing member,
- 16: restrictor end,
- 17: restrictor hole,
- 18: other restrictor end,
- 19: restrictor drilling,
- 21: balancing biasing member,
- 22: leak,
- 23: plug,
- 30: valve assembly,
- 31: tank,
- 32: line,
- 33: solenoid valve,
- 34: valve,
- 35, 36: strainer,
- 37: non-return valve,
- 38: bypass valve,
- 39: safety valve,
- 40: temperature sensor,
- S, S2: threshold.

The invention claimed is:

1. A fluidic device, comprising an inlet and an outlet connected by a body forming a channel between the inlet and the outlet, wherein the fluidic device comprises a non-return valve shaped to prevent a fluid from passing from the outlet to the inlet, and a flow restrictor shaped to allow a fluid to pass from the inlet to the outlet at a first flow rate when a differential pressure between the outlet and the inlet is below a threshold, and at a second flow rate, significantly lower than the first flow rate, when the differential pressure between the outlet and the inlet is above the threshold;

wherein the non-return valve comprises a non-return piston and a non-return seat, wherein the non-return piston is adapted to be pushed towards the non-return seat by a fluid flowing from the outlet to the inlet, wherein the non-return seat has a non-return hole coinciding with the inlet and the non- return piston comprises a non-return end, arranged opposite the non-return hole, shaped in a complementary manner to the non-return hole so that the non-return end closes the non-return hole when pushed against the non-return hole;

wherein the flow restrictor comprises a restrictor piston and a restrictor seat, the restrictor piston is adapted to be pushed towards the restrictor seat by a fluid flowing from the inlet to the outlet, the restrictor seat has a restrictor hole coinciding with the outlet and the restrictor piston comprises a restrictor end, arranged opposite the restrictor hole, shaped in a complementary manner to the restrictor hole so that the restrictor end closes the restrictor hole when pushed against the restrictor hole; and where the non-return piston and the restrictor piston are arranged telescopically.

2. The fluidic device according to claim 1, wherein the restrictor piston further comprises at least one restrictor through-hole.

3. The fluidic device according to claim 1, wherein the non-return seat, coinciding with the inlet, is made of the same material as the body or with a plug mounted on the body, and the restrictor seat, coinciding with the outlet, is made of the same material as the body or with a plug mounted on the body.

4. The fluidic device according to claim 3, wherein the non-return seat, coinciding with the inlet, is made with the plug mounted on the body.

5. The fluidic device according to claim 1, wherein the non-return piston further comprises at least one non-return through-hole.

6. The fluidic device according to claim 1, where the restrictor end is pierced by a leak opposite the restrictor hole.

7. The fluidic device according to claim 1, including a balancing biasing member tending to move the non-return piston away from the restrictor piston.

8. A fluidic device, comprising an inlet and an outlet connected by a body forming a channel between the inlet and the outlet, wherein the fluidic device comprises a non-return valve shaped to prevent a fluid from passing from the outlet to the inlet, and a flow restrictor shaped to allow a fluid to pass from the inlet to the outlet at a first flow rate when a differential pressure between the outlet and the inlet is below a threshold, and at a second flow rate, significantly lower than the first flow rate, when the differential pressure between the outlet and the inlet is above the threshold;

wherein the non-return valve comprises a non-return piston and a non-return seat, wherein the non-return piston is adapted to be pushed towards the non-return seat by a fluid flowing from the outlet to the inlet, wherein the non-return seat has a non-return hole coinciding with the inlet and the non- return piston comprises a non-return end, arranged opposite the non-return hole, shaped in a complementary manner to the non-return hole so that the non-return end closes the non-return hole when pushed against the non-return hole;

wherein the flow restrictor comprises a restrictor piston and a restrictor seat, the restrictor piston is adapted to be pushed towards the restrictor seat by a fluid flowing from the inlet to the outlet, the restrictor seat has a restrictor hole coinciding with the outlet and the restrictor piston comprises a restrictor end, arranged opposite the restrictor hole, shaped in a complementary manner to the restrictor hole so that the restrictor end closes the restrictor hole when pushed against the restrictor hole; and wherein the non-return valve further comprises a non-return biasing member, wherein the non-return biasing member tends to push the non-return piston towards the non-return seat and wherein the flow restrictor further comprises a restrictor biasing member, wherein the restrictor biasing member tends to move the restrictor piston away from the restrictor seat.

9. The fluidic device according to claim 8, wherein the restrictor piston further comprises at least one restrictor through-hole.

10. The fluidic device according to claim 8, wherein the non-return seat, coinciding with the inlet, is made of the same material as the body or with a plug mounted on the body, and the restrictor seat, coinciding with the outlet, is made of the same material as the body or with a plug mounted on the body.

11. The fluidic device according to claim 10, wherein the non-return seat, coinciding with the inlet, is made with the plug mounted on the body.

12. The fluidic device according to claim 8, wherein the non-return piston and the restrictor piston are arranged telescopically.

13. The fluidic device according to claim 12, wherein the non-return piston further comprises at least one non-return through-hole.

14. The fluidic device according to claim 8, where the restrictor end is pierced by a leak opposite the restrictor hole.

15. A fluidic device, comprising an inlet and an outlet connected by a body forming a channel between the inlet and the outlet. wherein the fluidic device comprises a non-return valve shaped to prevent a fluid from passing from the outlet to the inlet, and a flow restrictor shaped to allow a fluid to pass from the inlet to the outlet at a first flow rate when a differential pressure between the outlet and the inlet is below a threshold, and at a second flow rate, significantly lower than the first flow rate, when the differential pressure between the outlet and the inlet is above the threshold;

wherein the flow restrictor comprises a restrictor piston and a restrictor seat, the restrictor piston is adapted to be pushed towards the restrictor seat by a fluid flowing from the inlet to the outlet. the restrictor seat has a restrictor hole coinciding with the outlet and the restrictor piston comprises a restrictor end, arranged opposite the restrictor hole, shaped in a complementary manner to the restrictor hole so that the restrictor end closes the restrictor hole when pushed against the restrictor hole;

wherein the non-return valve comprises a non-return piston and a non-return seat, wherein the non-return piston is adapted to be pushed towards the non-return seat by a fluid flowing from the outlet to the inlet, wherein the non-return seat has a non-return hole coinciding with the inlet and the non-return piston comprises a non-return end, arranged opposite the non-return hole, shaped in a complementary manner to the non-return hole so that the non-return end closes the non-return hole when pushed against the non-return hole; and a balancing biasing member tending to move the non-return piston away from the restrictor piston.

16. The fluidic device according to claim 15, wherein the non-return piston and the restrictor piston are arranged telescopically.

17. The fluidic device according to claim 15, wherein the restrictor end is pierced by a leak opposite the restrictor hole.

18. The fluidic device according to claim 15, wherein the non-return seat, coinciding with the inlet, is made of the same material as the body or with a plug mounted on the body, and the restrictor seat, coinciding with the outlet, is made of the same material as the body or with a plug mounted on the body.

19. The fluidic device according to claim 15, wherein the non-return piston further comprises at least one non-return through-hole.

20. The fluidic device according to claim 15, wherein the restrictor piston further comprises at least one restrictor through-hole.

* * * * *